July 9, 1968     J. V. MAGEEAN     3,391,533

SELF-ADJUSTING ROCKET ENGINE

Filed May 16, 1966     2 Sheets-Sheet 1

James V. Mageean,
INVENTOR.

BY.

ATTORNEY.

July 9, 1968   J. V. MAGEEAN   3,391,533
SELF-ADJUSTING ROCKET ENGINE
Filed May 16, 1966                      2 Sheets-Sheet 2
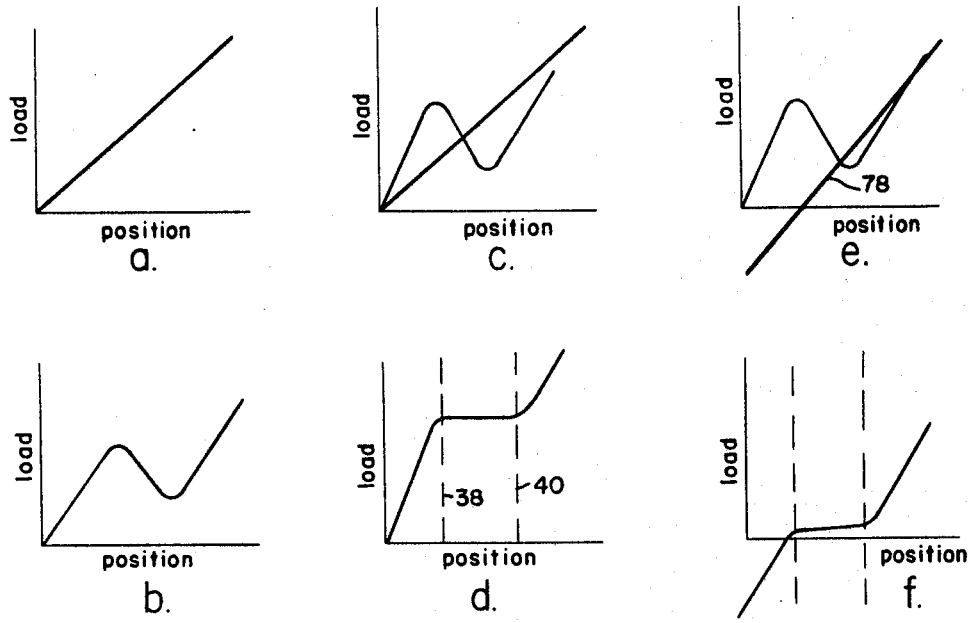
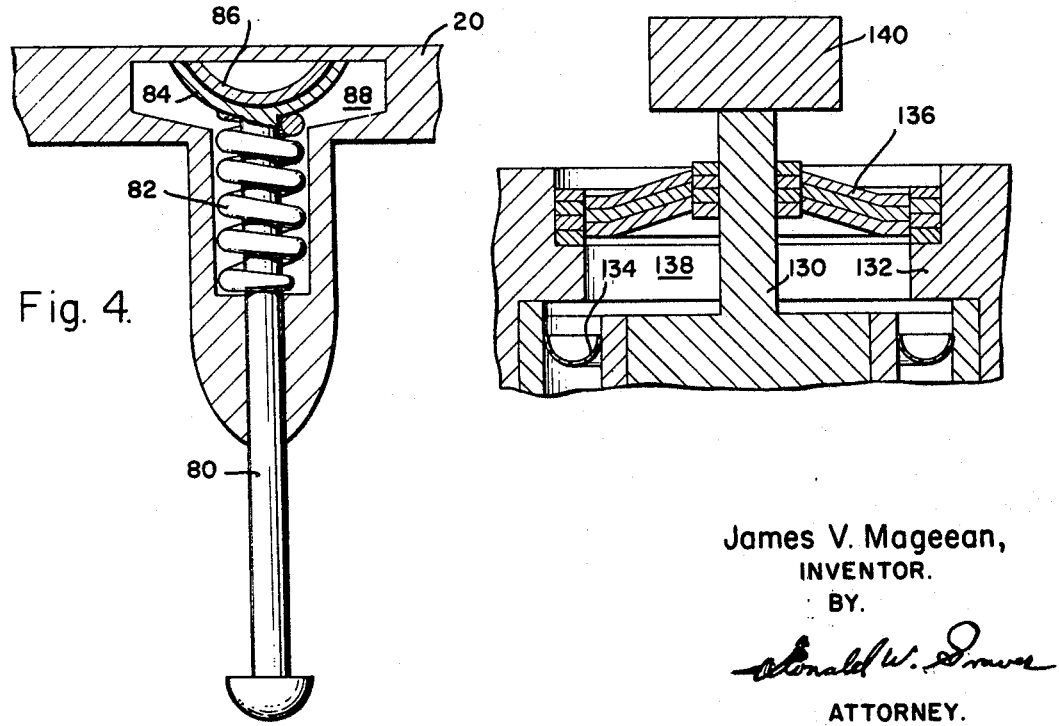
James V. Mageean,
INVENTOR.
BY.
ATTORNEY.

United States Patent Office 3,391,533
Patented July 9, 1968

3,391,533
SELF-ADJUSTING ROCKET ENGINE
James V. Mageean, Torrance, Calif., assignor to TRW Inc., Redondo Beach, Calif., a corporation of Ohio
Filed May 16, 1966, Ser. No. 550,203
11 Claims. (Cl. 60—39.27)

ABSTRACT OF THE DISCLOSURE

To maintain a constant combustion chamber pressure in a rocket engine or the like, a movable sleeve is provided which varies the propellant injection area in response to combustion chamber pressure. Movement in response to combustion chamber pressure is opposed by a constant bias. An alternative structure for accomplishing this is provided by a mass which will vary the propellant flow area in response to acceleration.

---

Figure 1:
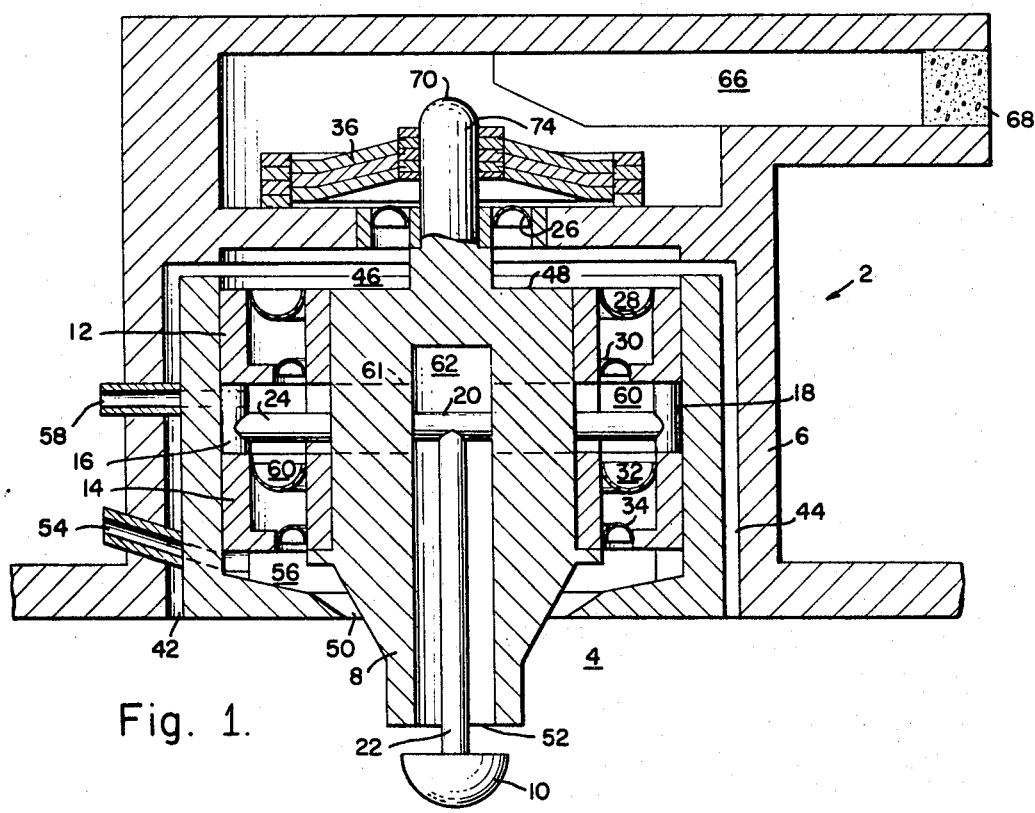

This invention relates to gas generating devices.

More particularly, this invention relates to a gas generating device which incorporates a mechanical system for maintaining constant combustion chamber pressure independent of propellant flow and upstream pressure.

A typical rocket engine or gas generating device comprises propellant storage tanks, an injector, a combustion chamber, a throat region and an expansion nozzle. The propellants are introduced into the combustion chamber through the injector and ignited. Ignition typically occurs either by an igniter or by hypergolic ignition.

Propellants are usually pressurized in one of two ways. In larger engines, pumps are provided which are driven by a turbine. In smaller engines, the tanks are usually pressurized or else a separate gas generator is employed to pressurize the propellants.

It is often desirable in either type of propellant pressurization systems to have a constant thrust engine. Thrust is directly proportional to the combustion chamber pressure. Combustion chamber pressure, in turn, is a function of the mass flow rate and mixture ratio of the propellants. Many attempts have been made to insure constant chamber pressure which include the following.

One attempt to provide this constant chamber pressure has been the provision of a system of pressure regulators accurately controlling the flow rate of the propellants. This is particularly the case in the use of gas pressurization pressure tanks where the pressure decays with depletion of propellant. The pressure regulator maintains propellant injection into the combustion chamber at a constant rate which then provides constant pressure. Disadvantages of this type of control include a lack of compensation for propellant density, particularly with cryogenics. When the density changes, the mass flow rate will change which affects chamber pressure. Another disadvantage includes a lack of accurate control over the mixture ratio.

When pumps are used, it is even more difficult to control flow rate due to the complexity and the presence of many moving parts.

To alleviate these problems, several attempts have been made. One method of achieving constant chamber pressure has been to employ a hydraulic balance mechanism. In this system, hydraulic fluid under pressure is exposed to a piston which, in turn, controls the propellant flow rate by varying the propellant injection area. Combustion chamber pressure is likewise exposed on the other side of the piston. When combustion chamber pressure drops, for example, the independent constant hydraulic pressure moves the piston to more fully open the area of injector, thus allowing more propellant to flow to increase the combustion chamber pressure. This method, while satisfactory in many respects, has the disadvantages of requiring a precisely controlled independent hydraulic pressure. An example of this is seen in the U.S. patent to Butler, No. 3,064,903 which is directed to modulating propellant flow by reference to combustion chamber pressure.

Another approach is to provide a spring which tends to close the injector area. This spring bias is opposed by the combustion chamber pressure such that as pressure increases, the injector area will decrease. The difficulty of this type system resides in the use of a linear type spring. In other words, the force of the spring is a function of the distance through which the spring moves. A more complicated approach has been to measure the combustion chamber pressure by means of a voltage readout and to compare this with a reference voltage in a feedback relationship so as to vary the injector area. This is a complicated system and has other disadvantages.

Briefly, this invention is a mechanical system for maintaining a constant combustion chamber pressure. A bias is provided which is constant regardless of spring position. The bias is opposed by combustion chamber pressure such that the combustion chamber pressure controls the propellant flow rate to insure constant chamber pressure.

Figure 3:
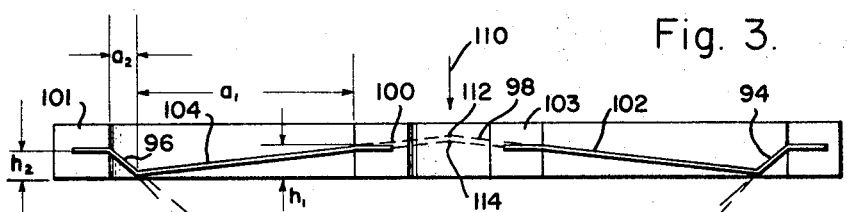
Figure 5:
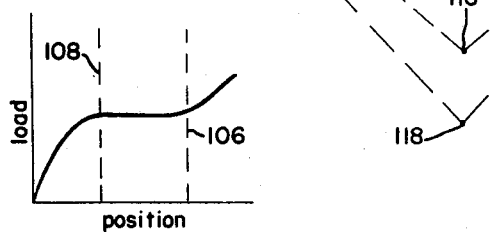

The objects and advantages of this invention will become apparent as this description proceeds, taken in conjunction with the drawings in which:

FIGURE 1 is a view, partially in cross section, of an injector assembly employing the features of this invention, FIGURE 2 illustrates a series of graphs of load versus position of different spring configurations, FIGURE 3 is a particular spring configuration and represents a different embodiment of the bias used, FIGURE 4 represents a modification whereby mixture ratio is controlled, FIGURE 5 is a graph of load versus position of the embodiment of FIGURE 3, and FIGURE 6 represents another embodiment of this invention.

The structure shown in FIGURE 1 represents an injector assembly designated generally at 2. For purposes of clarification the combustion chamber and nozzle structure has been omitted. It is understood that these would be employed as in the conventional gas generating device. The area shown at 4 is the combustion chamber which is enclosed by walls not shown. The injector assembly includes a housing 6 which has located therein a movable sleeve 8. This sleeve is adapted to move upwardly or downwardly as will be described later. A fixed pintle 10 is held within housing 6 by means of supports 12 and 14 which engage ends 16 and 18 of spider 20 which supports longitudinal member 22 of pintle 10. Spider 20 may include any number of transverse support arm 24.

Sleeve 8 is supported by annular spring members 26, 28, 30, 32, and 34. These spring members are linear within the region of operation. That is, the bias or force of these spring members is a function of the position of sleeve 8. This linear relationship is shown in FIGURE 2(a). A Belleville spring 36 applies a bias to sleeve 8 as a function of position as brought out in FIGURE 2(b). When the two spring biases are added together in parallel as shown in FIGURE 2(c), the resultant load versus position curve is as shown in FIGURE 2(d). Thus, the spring bias is chosen such that full movement of sleeve 8 is within lines 38 and 40 of FIGURE 2. Thus, it can be seen that the combination of the linear and Belleville springs exert a constant force on sleeve 8 regardless of position. By changing the initial bias of the linear springs as by the use of shims, the force can be varied (see FIGURE 2(f)) to provide thrust control.

Resisting the forces exerted by the springs is combustion chamber pressure. This chamber pressure is fed through lines 42 and 44 into manifold 46 on spring 28 and surface 48. Movement of sleeve 8, as can be appreciated from FIGURE 1, will vary the area of propellant injector ports 50 and 52 which are shown as being annular.

Propellant such as oxidizer is introduced by means of line 54 into manifold 56 and thence through annular port 50 into combustion chamber 4. In a similar manner, propellant such as fuel is introduced by means of port 58 into manifold 60 and through openings 61 in sleeve 8 into volume 62 and into combustion chamber 4 through annular injector port 52. Propellant pressure exerted on sleeve 8 is substantially balanced since the area of springs 30 and 34 together is substantially equal to the area of spring 32.

A slidable member 66 is provided which, when driven to the left by charge 68, will engage surface 70 of pintle 10 and by wedge action, will drive sleeve 8 downward, thus completely closing ports 50 and 52.

In operation, propellant is injected through ports 50 and 52 which mix in combustion chamber 4 and by any well known means ignited, thus creating pressure in chamber 4. By proper sizing of the linear and Belleville springs, a predetermined pressure in chamber 4 can be maintained. This is accomplished in the following manner.

Assuming that the desired chamber pressure is achieved, sleeve 8 will stay in a fixed position. This position is determined by the bias of the springs as opposed to the combustion chamber pressure exerted in manifold 46. Should this pressure drop, the springs will force sleeve 8 upwardly thus increasing the injector areas 50 and 52 to allow more propellant flow which, when burned, will increase the combustion chamber pressure in manifold 46, thus driving sleeve 8 downwardly to decrease propellant flow. To eliminate "hunting" or rapid movement, pintle 2 may include a relatively large mass such as at 74 to provide high inertia and thus a slow response to acceleration.

Should it be desirable to produce different thrust levels, the linear spring may be chosen such that a lower constant bias can be provided or if desired, a higher one. An example of this is seen in FIGURE 2(e) by line 78 with the combined characteristics shown in FGURE 2(f). Thus, various thrust levels can be chosen by varying the linear spring position such as by shims or the like.

FIGURE 3 represents one embodiment of this invention which exhibits combination linear and Belleville spring characteristics. This is accomplished by flattening the "break" in the Belleville spring. FIGURE 5 is illustrative of such a characteristic and is similar to the characteristic shown in FIGURE 2(d).

The embodiment shown in FIGURE 3 comprises essentially a double action Belleville flexure. Two conical sections are used with the apex of one section located at a substantially farther point from the plane of flexure than the apex of the other conical section. One conical section is formed by the dotted lines 90 and 92 which represents extentions of the walls 94 and 96 respectively. In a similar manner a cone is formed as shown as dotted lines 98 and 100 which are the extentions of flexure walls 102 and 104 respectively. With this type of construction a relatively constant force versus position occurs as, for example, between lines 106 and 108 as shown in FIGURE 5. When a force is applied in the direction of arrow 110, the appex represented at 112 will move to the position 114 while apex 116 moves to the position 118. Annular supports 101 and 103 support the ends of the flexure. The flexure characteristic of this type of spring is characterized by the following formula.

$$P = \frac{Ef}{(1-\sigma^2)} \left\{ \frac{1}{M_1 a_1^2} \left[ \left( h_1 - \frac{f}{2} \right) (h_1 - f) t + t^3 \right] - \frac{1}{M_2 a_2^2} \left[ \left( h_2 - \frac{f}{2} \right) (h_2 - f) t + t^3 \right] \right\}$$

Where:

$E$ = Young's modulus
$P$ = load in pounds
$F$ = deflection in inches
$h_2$ or $h_1$ = free height minus thickness in inches
$a_2$ or $a_1$ = ½ outside diameter in inches
$\sigma$ = Poisson's ratio
$M_1$ or $M_2$ = constant
$t$ = thickness of material in inches FIGURE 4 illustrates a manner in which the mixture ratio is maintained constant regardless of temperature changes. Ordinarily, when the temperature of the propellant goes up or down, the density of one of the propellants changes more rapidly than the density of the other propellant. Without temperature compensation, the mixture ratio will change, thus degrading the engine performance. Control of the mixture ratio is accomplished by providing a bi-metallic element on the pintle. As shown in FIGURE 4, pintle 80 is supported in the housing by means of spring 82, arm 84 and arm 86 which has a different coefficient of thermal expansion than arm 84. Pintle 80 will move upor down slightly as a function of temperature in manifold 88 which has propellant introduced therein. To aid in visualizing the FIG. 4 structure in the environment of FIG. 1, the same spider 20 designation is used.

In operation the following example is given. Assuming that as the temperature of the propellant increases, the density of propellant in manifold 88 will decrease more rapidly than the other propellant employed. When this occurs, pintle 80, due to elements 84 and 86, will move upwardly thus increasing the area between pintle 10 and sleeve 8 (FIGURE 1) to allow more propellant flow there-through. In this manner the mass flow rate of one propellant relative to the other will remain constant irrespective of temperature.

Another embodiment of this invention is illustrated in FIGURE 6. This embodiment is similar in all respects to that shown in FIGURE 1 with the exception of the means for controlling propellant flow to maintain constant combustion chamber pressure or thrust. The injector portions are not shown as they would be substantially identical to that of FIGURE 1.

The differences reside in eliminating the port 42 from the combustion chamber to the rear of the sleeve and in providing a relatively large mass on the sleeve. Sleeve 130, as in the case of FIGURE 1, is attached to housing 132 by means of linear spring 134 (and others not shown) and Belleville spring 136. Manifold 138 is not exposed to combustion chamber pressure. A large mass 140 is attached to sleeve 130.

In operation the device shown in FIGURE 6 functions as follows:

The mass is selected such that for a given acceleration, which is proportional to thrust and hence to combusion chamber pressure, sleeve 130 will remain in a predetermined single position relative to housing 132 such that the propellant injector area remains constant.

Should combustion chamber pressured drop from the predetermined desired level, the force due to acceleration of mass 140 and its associated structure will decrease. Sleeve 130 will then move upwardly to increase propellant injection thus restoring combustion chamber pressure. Conversely, should combustion chamber pressure increase over the desired level, mass 140 and its associated structure will tend to overcome the bias of the springs, moving sleeve 130 downwardly which tends to decrease propellant injection thus reducing combustion chamber pressure.

While this invention has been described as finding application in gas generating devices for a rocket engine, it is intended that the invention also has utility as a valve. Thus, the device can be used to introduce fluid or fluids when it is desirable to maintain downstream pressure constant. It can be seen, therefore, that the invention is not confined to a gas generating device but can be used, for example, as a pressure regulator.

It is further understood that while the device has been described as introducing more than one fluid, it is within the scope of this invention to introduce more than two fluids or to merely have one fluid flowing.

Having described this invention, it is to be understood that the scope thereof is to be measured only by the claims appended hereto.

What is claimed is:

1. In a gas generating device, a combustion chamber and an injector assembly comprising;
    a housing,
    a movable sleeve,
    a fixed pintle, said movable sleeve forming with said housing an annular opening for injection of a first propellant into said combustion chamber and with said pintle an annular opening for injection of a second propellant into said chamber, said sleeve being adapted to move to vary the area of said annular openings,
    means to apply combustion chamber pressure to said sleeve to bias said sleeve in a direction to decrease the area of said annular openings, and
    bias means operative to move said sleeve to a position to increase the area of said annular openings, said bias means exerting a constant force on said sleeve irrespective of the position of said sleeve.

2. In a gas generating device according to claim 1 wherein said bias means comprises at least one spring.

3. In a gas generating device according to claim 2 wherein said spring comprises the combination of a linear spring and a Belleville spring in parallel.

4. A gas generating device according to claim 3 wherein said linear spring comprises at least one annular diaphragm attached to said housing and to said movable sleeve.

5. A gas generating device according to claim 4 wherein a plurality of said diaphragms are employed, said diaphragms further being adapted to separate said propellants from each other and from combustion chamber gases prior to injection of said propellants into said combustion chamber.

6. A gas generating device according to claim 1 and further including a mass associated with said movable sleeve to reduce response to rapid acceleration.

7. A gas generating device according to claim 1 wherein said bias means comprises a double flexure Belleville spring, having a first and second conical section with the apex of each section being located on opposite sides of the plane of flexure of said spring, one of said apexes being located at a substantially greater distance from said plane of flexure than the other of said apexes.

8. A gas generating device according to claim 7 wherein the flexural characteristics of said spring is determined by the following formula:

$$P = \frac{Ef}{(1-\sigma^2)} \left\{ \frac{1}{M_1 a_1^2} \left[ \left(h_1 - \frac{f}{2}\right)(h_1 - f)t + t^3 \right] - \frac{1}{M_2 a_2^2} \left[ \left(h_2 - \frac{f}{2}\right)(h_2 - f)t + t^3 \right] \right\}$$

Where:
$E$ = Young's modulus
$P$ = load in pounds
$F$ = deflection in inches
$h_1$ = free height of said first section
$h_2$ = free height of said second section
$a_1 = \frac{1}{2}$ outside radial dimension of said first section
$a_2 = \frac{1}{2}$ outside radial dimension of said second section
$\sigma$ = Poisson's ratio
$M_1$ = constant
$M_2$ = constant
$t$ = material thickness in inches 9. A valve comprising;
    a fixed portion,
    a movable sleeve, said movable sleeve forming with said fixed portion an annular opening for injection of pressurized fluid, said sleeve being adapted to move to vary the area of said annular opening.
    conduit means to apply said pressurized fluid to said sleeve to bias said sleeve in a direction to decrease the area of said annular opening, and
    bias means operative to move said sleeve to a position to increase the area of said annular opening,
    said bias means comprising the combination of a linear spring and a Belleville spring, said combination of springs exerting a constant force on said sleeve irrespective of the position of said sleeve.

10. A valve according to claim 9 wherein a pintle is provided within said movable sleeve which forms with said pintle an annular opening for injection of a second fluid, said sleeve being adapted to move to vary the area of said annular opening between said sleeve and said pintle.

11. In a gas generating device, a combustion chamber and injector assembly comprising;
    a housing,
    a movable sleeve,
    a fixed pintle, said movable sleeve forming with said housing an annular opening for injection of a first propellant into said combustion chamber and with said pintle an annular opening for injection of a second propellant into said combustion chamber,
    bias means operative to move said sleeve to a position to increase the area of said opening, said sleeve further including a substantially heavy mass, said bias means exerting a constant force on said sleeve irrespective of the position thereof, said force being equal to the inertial force of said mass at a predetermined acceleration of said device,
    whereby, when acceleration of said device is at said predetermined level, said movable sleeve will occupy a predetermined fixed position relative to said pintle and housing and when said acceleration increases, said sleeve will move to decrease the area of said annular openings and when said acceleration decreases, said sleeve will move to increase the area of said annular openings.

References Cited

UNITED STATES PATENTS

| | | | |
|---|---|---|---|
| 2,995,008 | 8/1961 | Fox | 60—240 |
| 3,064,903 | 11/1962 | Butler | 60—258 |
| 3,106,822 | 10/1963 | Bragg | 60—39.28 |
| 3,172,254 | 3/1965 | Wright | 60—240 |
| 3,224,459 | 12/1965 | Lilly | 137—510 |

MARTIN P. SCHWADRON, *Primary Examiner.*

D. HART, *Assistant Examiner.*